E. JAHODA.
SAFETY ELECTRIC WELDING TORCH.
APPLICATION FILED MAR. 11, 1920.
1,340,270.  Patented May 18, 1920.
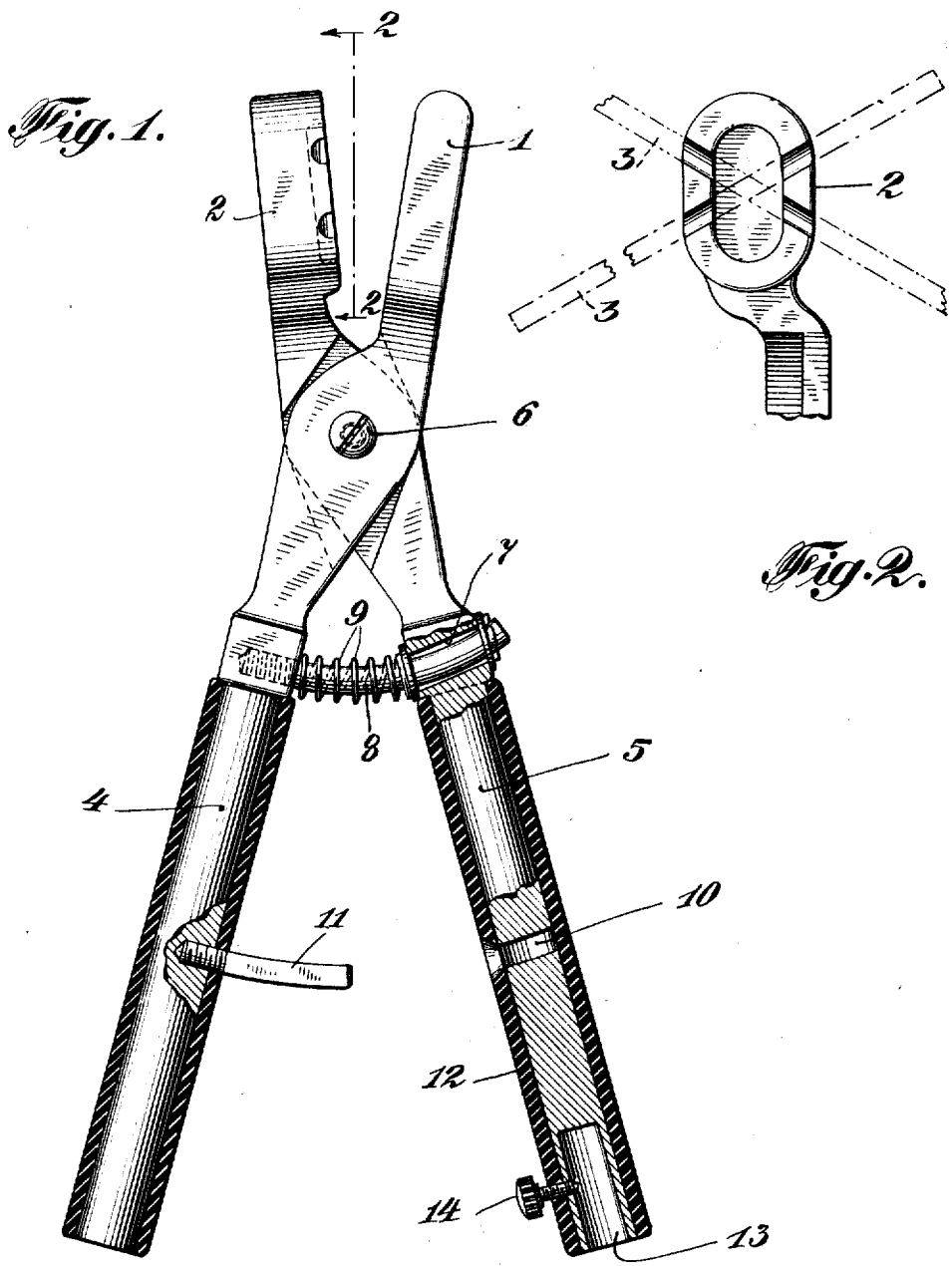
Inventor
*Emil Jahoda*
By his Attorney
Benjamin Webster

UNITED STATES PATENT OFFICE.

EMIL JAHODA, OF NEW YORK, N. Y.

SAFETY ELECTRIC WELDING-TORCH.

1,340,270.   Specification of Letters Patent.   Patented May 18, 1920.

Application filed March 11, 1920. Serial No. 365,027.

*To all whom it may concern:*

Be it known that I, EMIL JAHODA, a citizen of the United States, residing at New York city, in the county of New York and State of New York, have invented certain new and useful Improvements in Safety Electric Welding-Torches, of which the following is a specification.

This invention relates to electric welding and more particularly to portable torches used in electric welding.

It has for its objects, first, to provide an improved safety structure whereby the electric current is automatically cut off when the torch is laid aside, and, second, to provide other improvements to effect a more practical torch than those now in use.

In a preferred form the invention consists in the usual plier-like gripping device, the face of one of the jaws having crossed grooves so that the welding rod may be placed in four positions with reference to the torch to facilitate reaching into corners and the like, and having the usual handles covered with insulating material. One of the handles is provided with a terminal at its end and this handle has a break in the conductor extending therethrough to form a socket adapted to receive a plug carried on the other handle, the plug and the socket coöperating to form a make-and-break device for the electric current. Between the handles is a spring that automatically separates the handles and breaks the circuit the instant the operator's grip on the handles is released.

For a detailed description of the preferred embodiment of the invention reference is made to the drawings in which—

Figure 1 is a side view, showing the terminal for the electric cable and the make-and-break device in cross-section, and Fig. 2 is a view of the grooved face of one of the jaws, showing the possible positions of the welding rod.

As shown in the drawing the preferred embodiment of my invention of an improved safety electric welding torch is of the usual plier-like structure, comprising two gripping jaws, 1 and 2, and corresponding handles 4 and 5. The face of one of the gripping jaws 2 is provided with crossed grooves whose directions are at oblique angles to the edge, which are adapted to secure the welding rod 3 in any of four positions to facilitate the use of the torch in welding.

The two parts of the torch are crossed and hinged together by means of the screw 6 which forms a pivot fulcrum for the two levers. Mounted in one handle is an arcuate shaft 8 and in the other handle is a corresponding bore adapted to receive the shaft. The bore is designated by the reference numeral 7. Between the two parts on the shaft 8 is mounted a coil spring 9, normally tending to separate the parts of the torch. At the outer end of the arcuate shaft 8 are suitable securing devices such as the washer and cotter pin shown.

The levers of the torch are of metal, usually brass, to furnish a good conductor for the electric current employed in welding. The handles are covered with suitable insulating material. In the handle 5 a break or socket 10 is formed, into which the plug 11, which is fast on the handle 4, is adapted to fit to make and break the circuit through the conductor in the handle 5.

It is apparent that as soon as the operator's grip on the handles 4 and 5 is released the spring 9 presses them apart and the plug 11 is drawn from the break or socket 10. Plug 11 and socket 10 therefore form a make-and-break device which is automatically operated upon release of the operator's grip on the handles. The advantage of this structure is that the current to the jaws is automatically cut off when the tool is laid aside, thus eliminating the danger of electric shock to the operator.

Both of the handles 4 and 5 are covered with a layer of insulating material such as vulcanized rubber, designated by the reference numeral 12. At the outer end of the handle 5 is a socket 13 adapted to receive the conducting cable, not shown in the drawing but of usual construction, which is fastened therein by means of the set screw 14.

It is apparent from the foregoing that I have provided an improved electric safety welding torch in which the current is automatically cut off when the torch is laid aside and which is of a structure designed to facilitate the work of electric welding.

Realizing that many modifications may be made in my device within the scope of my invention I do not limit myself except as in the appended claims.

I claim:

1. An improved electric welding torch having means for gripping a welding rod, means for conducting an electric current to said rod, and a circuit-breaker automatically operated to cut off the electric current when the grip on the welding rod is released.

2. An improved electric welding torch having two parts hinged together in the manner of pliers, having gripping jaws to hold a welding rod, and having two handles, one of said handles having a conductor extending therethrough with a terminal for an electric cable at the outer end and a switch interposed in the conductor.

3. An improved electric welding torch having two parts hinged together in the manner of pliers, having gripping jaws to hold a welding rod, having means for conducting an electric current to the welding rod, and having an automatic circuit-breaker carried by one of the parts.

4. An improved electric welding torch having means for gripping a welding rod, means for conducting an electric current to said rod, insulated handles for actuating said gripping means, and a circuit-breaker automatically operated to break the circuit as the actuating handles are returned to inoperative position.

5. An improved electric welding torch having two parts hinged together in the manner of pliers, the front ends of said parts forming gripping jaws to grip a welding rod, the back ends of said parts forming handles, means for conducting an electric current through one of the handles and having a circuit-breaker interposed therein, and means for actuating said circuit-breaker carried by the other handle.

6. An improved electric welding torch having two parts hinged together in the manner of pliers, the front ends of said parts forming gripping jaws to grip a welding rod, the back ends of said parts forming handles, means for conducting an electric current through one of the handles, a socket formed in said conducting means and adapted to break the circuit, and a plug carried by the other handle and adapted to fit in said socket to make the circuit.

7. An improved electric welding torch having two parts hinged together in the manner of pliers, the front ends of said parts forming gripping jaws to grip a welding rod, the back ends of said parts forming handles, a spring tending to hold said handles apart, means for conducting an electric current through one of the handles, a socket formed in said conducting means and adapted to break the circuit, and a plug carried by the other handle and adapted to fit in said socket and to make the circuit, whereby when the operator's grip on the handles is released the circuit through the conducting means is automatically broken.

8. An improved electric welding torch having two parts hinged together in the manner of pliers, the front ends of said parts forming gripping jaws to grip a welding rod, the back ends of said parts forming handles, means for conducting an electric current through one of the handles, a bore through one of the handles, a shaft carried by the other handle and adapted to slide in said bore, and a spring mounted on said shaft between the handles and tending to hold the handles in spaced apart relationship.

9. An improved electric welding torch having two parts hinged together in the manner of pliers, the back end of said parts forming handles, the front ends of said parts forming gripping jaws to hold a welding rod, and the gripping face of one of the jaws having crossed grooves each of which is oblique to the edge of the jaw whereby the welding rod may be held in a plurality of angular positions with reference to the torch, means for conducting an electric current through one of the handles, and means for automatically interrupting the current as the jaws separate from each other.

In testimony whereof I affix my signature.

EMIL JAHODA.